(12) United States Patent
Kang et al.

(10) Patent No.: US 11,881,021 B2
(45) Date of Patent: Jan. 23, 2024

(54) METHOD OF PROVIDING CARBON EMISSION MANAGEMENT INFORMATION, AND SERVER AND SYSTEM USING THE SAME

(71) Applicant: AJOU UNIVERSITY INDUSTRY-ACADEMIC COOPERATION FOUNDATION, Suwon-si (KR)

(72) Inventors: Juyoung Kang, Suwon-si (KR); Sehyoung Kim, Suwon-si (KR); Seyeon Chun, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 18/187,353

(22) Filed: Mar. 21, 2023

(65) Prior Publication Data
US 2023/0401846 A1 Dec. 14, 2023

(30) Foreign Application Priority Data
Jun. 14, 2022 (KR) .................. 10-2022-0072210

(51) Int. Cl.
G06V 20/10 (2022.01)
G06Q 50/26 (2012.01)

(52) U.S. Cl.
CPC ........... *G06V 20/188* (2022.01); *G06Q 50/26* (2013.01)

(58) Field of Classification Search
CPC .................. G06V 20/188; G06Q 50/26
See application file for complete search history.

(56) References Cited

FOREIGN PATENT DOCUMENTS

KR 10-2015-0101851 A 9/2015
KR 2015101851 A * 9/2015
(Continued)

OTHER PUBLICATIONS

Douthat, Thomas, et al. "Passive building characteristics, and summertime residential energy use: A spatial analysis of energy efficiency in Gainesville, FL." Building and environment 169 (2020): 106542. (Year: 2020).*

(Continued)

*Primary Examiner* — Vu Le
*Assistant Examiner* — Tracy Mangialaschi
(74) *Attorney, Agent, or Firm* — Sughrue Mion, PLLC (57) ABSTRACT

Provided are a method of providing carbon emission management information, the method comprising extracting, by a carbon emission management information providing server, an area corresponding to a company to be evaluated from satellite image data of the company to be evaluated, calculating, by the carbon emission management information providing server, a greenhouse gas concentration of the area corresponding to the company to be evaluated from the satellite image data, calculating, by the carbon emission management information providing server, a change in vegetation index around the company to be evaluated from the satellite image data, analyzing, by the carbon emission management information providing server, a relationship between carbon emission management factors input in relation to the company to be evaluated, a change in the calculated greenhouse gas concentration, and the calculated change in vegetation index and generating, by the carbon emission management information providing server, carbon emission management information by using both a relationship between the carbon emission management factors and the change in the calculated greenhouse gas concentration and a relationship between the carbon emission management (Continued)

factors and the calculated change in vegetation index according to a result of the analyzing, and providing the generated carbon emission management information.

12 Claims, 4 Drawing Sheets

(56) References Cited

FOREIGN PATENT DOCUMENTS

| KR | 10-2016-0008781 A | 1/2016 | |
|---|---|---|---|
| KR | 10-1998778 B1 | 7/2019 | |
| KR | 1998778 B1 * | 10/2019 | ............ G01W 1/02 |
| KR | 10-2351118 B1 | 1/2022 | |

OTHER PUBLICATIONS

Request for the Submission of an Opinion for KR 10-2022-0072210 dated Jun. 14, 2022.
Written Decision on Registration for KR 10-2022-0072210 dated Dec. 12, 2022.

* cited by examiner

METHOD OF PROVIDING CARBON EMISSION MANAGEMENT INFORMATION, AND SERVER AND SYSTEM USING THE SAME

CROSS-REFERENCE TO RELATED APPLICATIONS

This application claims the benefit of Korean Patent Application No. 10-2022-0072210, filed on Jun. 14, 2022, in the Korean Intellectual Property Office, the disclosure of which is incorporated herein in its entirety by reference.

BACKGROUND

1. Field

The present disclosure relates to a method of providing carbon emission management information, and a server and a system using the method, and more particularly, to a method capable of providing carbon emission management information through an analysis of a relationship between a change in greenhouse gas concentration around a company to be evaluated and carbon emission management factors of the company to be evaluated, and a server and a system using the method.

2. Description of the Related Art

As phenomena that clearly show the global climate crisis have appeared, climate problems have emerged, and the emission of greenhouse gases is pointed out as a representative cause of the climate crisis.

Greenhouse gases include carbon dioxide and methane. Although methane is emitted relatively little, it has a greenhouse effect that is ten times greater than carbon dioxide, which is known to have a large greenhouse effect.

In view of this climate crisis and the recent ESG management required of companies, the demand for strict management of carbon emissions is increasing.

SUMMARY

Provided are a method capable of providing carbon emission management information through an analysis of a relationship between a change in greenhouse gas concentration around a company to be evaluated and carbon emission management factors of the company to be evaluated, and a server and a system using the method.

According to an aspect of an embodiment, a method of providing carbon emission management information may comprise extracting, by a carbon emission management information providing server, an area corresponding to a company to be evaluated from satellite image data of the company to be evaluated, calculating, by the carbon emission management information providing server, a greenhouse gas concentration of the area corresponding to the company to be evaluated from the satellite image data, calculating, by the carbon emission management information providing server, a change in vegetation index around the company to be evaluated from the satellite image data, analyzing, by the carbon emission management information providing server, a relationship between carbon emission management factors input in relation to the company to be evaluated, a change in the calculated greenhouse gas concentration, and the calculated change in vegetation index and generating, by the carbon emission management information providing server, carbon emission management information by using both a relationship between the carbon emission management factors and the change in the calculated greenhouse gas concentration and a relationship between the carbon emission management factors and the calculated change in vegetation index according to a result of the analyzing, and providing the generated carbon emission management information, wherein the analyzing of the relationship between carbon emission management factors input in relation to the company to be evaluated, the change in the calculated greenhouse gas concentration, and the calculated change in vegetation index may comprise calculating, by the carbon emission management information providing server, a relative influence of each of the carbon emission management factors on the change in the greenhouse gas concentration as a numerical value.

In some embodiments, the satellite image data may comprise hyperspectral image data.

In some embodiments, the extracting of an area corresponding to the company to be evaluated may comprise determining a building area of the company to be evaluated, and extracting an area within a reference distance from the building area as an area corresponding to the company to be evaluated.

In some embodiments, the calculating of a greenhouse gas concentration of the area corresponding to the company to be evaluated may comprise extracting, by the carbon emission management information providing server, a first image corresponding to a short-wavelength infrared (SWIR) wavelength band or a second image corresponding to a mid-wavelength infrared (MWIR) wavelength band from the satellite image data, wherein the carbon emission management information providing server calculates a greenhouse gas concentration of the area corresponding to the company to be evaluated by using the first image or the second image.

In some embodiments, a vegetation index around the company to be evaluated may be a vegetation index of vegetation distributed over a greater area than the area corresponding to the company to be evaluated.

In some embodiments, the vegetation index may be a normalized difference vegetation index (NDVI).

In some embodiments, the method may further comprise collecting, by the carbon emission management information providing server, climate data around the company to be evaluated.

In some embodiments, the climate data may comprise data about weather, temperature, and precipitation.

In some embodiments, the calculating of a greenhouse gas concentration of the area corresponding to the company to be evaluated may comprise calculating, by the carbon emission management information providing server, a corrected greenhouse gas concentration by removing influencing factors based on the climate data from the calculated greenhouse gas concentration of the area corresponding to the company to be evaluated.

In some embodiments, the carbon emission management factors may comprise at least one of an operation rate of devices in the company to be evaluated, fossil fuel consumption of the company to be evaluated, a status of carbon capture facilities of the company to be evaluated, and the amount of heating and cooling used by the company to be evaluated.

In some embodiments, the providing of the carbon emission management information according to a result of the analyzing may comprise providing, by the carbon emission management information providing server, information about an abnormal situation when the change in the calculated greenhouse gas concentration in the area corresponding to the company to be evaluated is greater than a reference value.

According to an aspect of an embodiment, a carbon emission management information providing server including a processor and a memory, the carbon emission management information providing server may comprise a target area extraction module configured to extract an area corresponding to a company to be evaluated from satellite image data of the company to be evaluated, a greenhouse gas concentration calculation module configured to calculate a greenhouse gas concentration of the area corresponding to the company to be evaluated from the satellite image data, a vegetation index analysis module configured to calculate a change in vegetation index around the company to be evaluated from the satellite image data and a carbon emission management information generation module configured to analyze a relationship between carbon emission management factors input in relation to the company to be evaluated, a change in the calculated greenhouse gas concentration, and the calculated change in vegetation index, to generate carbon emission management information by using both a relationship between the carbon emission management factors and the change in the calculated greenhouse gas concentration and a relationship between the carbon emission management factors and the calculated change in vegetation index according to a result of the analyzing, and to provide the generated carbon emission management information, wherein the carbon emission management information generation module calculates a relative influence of each of the carbon emission management factors on the change in the greenhouse gas concentration as a numerical value.

According to an aspect of an embodiment, a carbon emission management information providing system may comprise a user terminal and a carbon emission management information providing server configured to provide carbon emission management information to the user terminal in correspondence with carbon emission management factors related to a company to be evaluated input through the user terminal, wherein the carbon emission management information providing server may comprise a target area extraction module configured to extract an area corresponding to the company to be evaluated from satellite image data of the company to be evaluated, a greenhouse gas concentration calculation module configured to calculate a greenhouse gas concentration of the area corresponding to the company to be evaluated from the satellite image data, a vegetation index analysis module configured to calculate a change in vegetation index around the company to be evaluated from the satellite image data and a carbon emission management information generation module configured to analyze a relationship between carbon emission management factors input in relation to the company to be evaluated, a change in the calculated greenhouse gas concentration, and the calculated change in vegetation index, to generate the carbon emission management information by using both a relationship between the carbon emission management factors and the change in the calculated greenhouse gas concentration and a relationship between the carbon emission management factors and the calculated change in vegetation index according to a result of the analyzing, and to provide the generated carbon emission management information, wherein the carbon emission management information generation module calculates a relative influence of each of the carbon emission management factors on the change in the greenhouse gas concentration as a numerical value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, each processes may be performed by hardware such as a processor, a microprocessor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software in a system. Furthermore, the system may include a memory that stores program or data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the disclosure will be described in detail.

Figure 1:
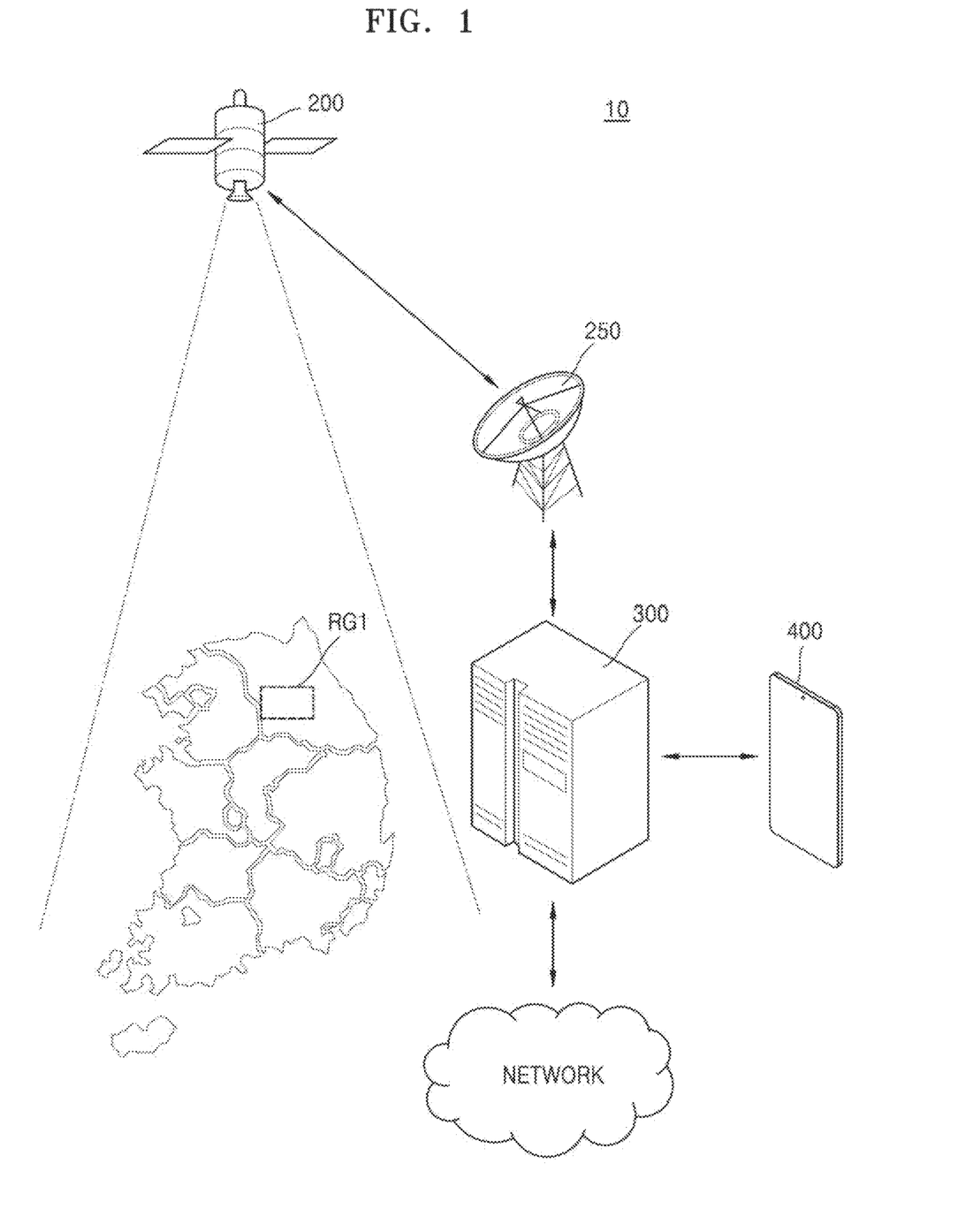
FIG. 1 is a conceptual diagram of a carbon emission management information providing system according to an embodiment.

FIG. 1 is a conceptual diagram of a carbon emission management information providing system according to an embodiment.

Referring to FIG. 1, a carbon emission management information providing system 10 is a system capable of providing carbon emission management information by calculating a greenhouse gas concentration of a first area RG1 corresponding to a company to be evaluated and analyzing a relationship between carbon emission management factors input in relation to the company to be evaluated and a change in the greenhouse gas concentration of the first area RG1.

The carbon emission management information providing system 10 may include a satellite 200, a ground station 250, a carbon emission management information providing server 300, and a user terminal 400.

According to an embodiment, the first area RG1 may be an area corresponding to an input executed by a user through the user terminal 400.

According to another embodiment, the first area RG1 may be an area selected by the carbon emission management information providing server 300.

The satellite 200 may obtain a satellite image about the first area RG1 by using a satellite camera mounted on the satellite 200 and may transmit satellite image data about the obtained satellite image to the ground station 250.

According to an embodiment, the satellite 200 may transmit satellite image data including a hyperspectral image to the ground station 250 by using a hyperspectral camera mounted on the satellite 200.

The ground station 250 is located on the ground and may include a satellite antenna to receive various data transmitted from the satellite 200. The ground station 250 may receive the satellite image data transmitted from the satellite 200, and transmit the received satellite image data to the carbon emission management information providing server 300.

According to an embodiment, the carbon emission management information providing system 10 may be implemented in a form that does not include the ground station 250.

According to another embodiment, the carbon emission management information providing system 10 may include a separate server (not shown) for managing satellite image data, and in this case, the carbon emission management information providing server 300 may receive satellite image data from the separate server (not shown).

The carbon emission management information providing server 300 may receive satellite image data transmitted from the ground station 250, generate carbon emission management information about a company to be evaluated based on the received satellite image data, and provide the generated carbon emission management information to the user terminal 400.

According to an embodiment, the carbon emission management information providing server 300 may extract the first area RG1 corresponding to a company to be evaluated related to identification information (e.g., company name, business registration number, etc.) or address input by a user through the user terminal 400, and generate carbon emission management information about the company to be evaluated through a change in the greenhouse gas concentration of the first area.

In this case, the carbon emission management information providing server 300 may collect intellectual data corresponding to identification information or an address input through a wired or wireless network to extract the first area RG1 corresponding to the company to be evaluated related to the identification information or address input by the user. The carbon emission management information providing server 300 may extract the first area RG1 corresponding to the company to be evaluated from the satellite image data by using the identification information or address input by the user and the collected intellectual data together.

The carbon emission management information providing server 300 may generate carbon emission management information about the company to be evaluated and provide the carbon emission management information to the user terminal 400.

Detailed structure and operation of the carbon emission management information providing server 300 will be described later with reference to FIGS. 2 to 4.

A user may be provided with carbon emission management information about a company to be evaluated through the user terminal 400.

According to an embodiment, the user terminal 400 may be implemented as a communication-enabled terminal. Although a smartphone is shown as an exemplary form of the user terminal 400 in FIG. 1, the user terminal 400 may be implemented as various types of devices capable of wired/wireless communication (e.g., PC, etc.).

Figure 2:
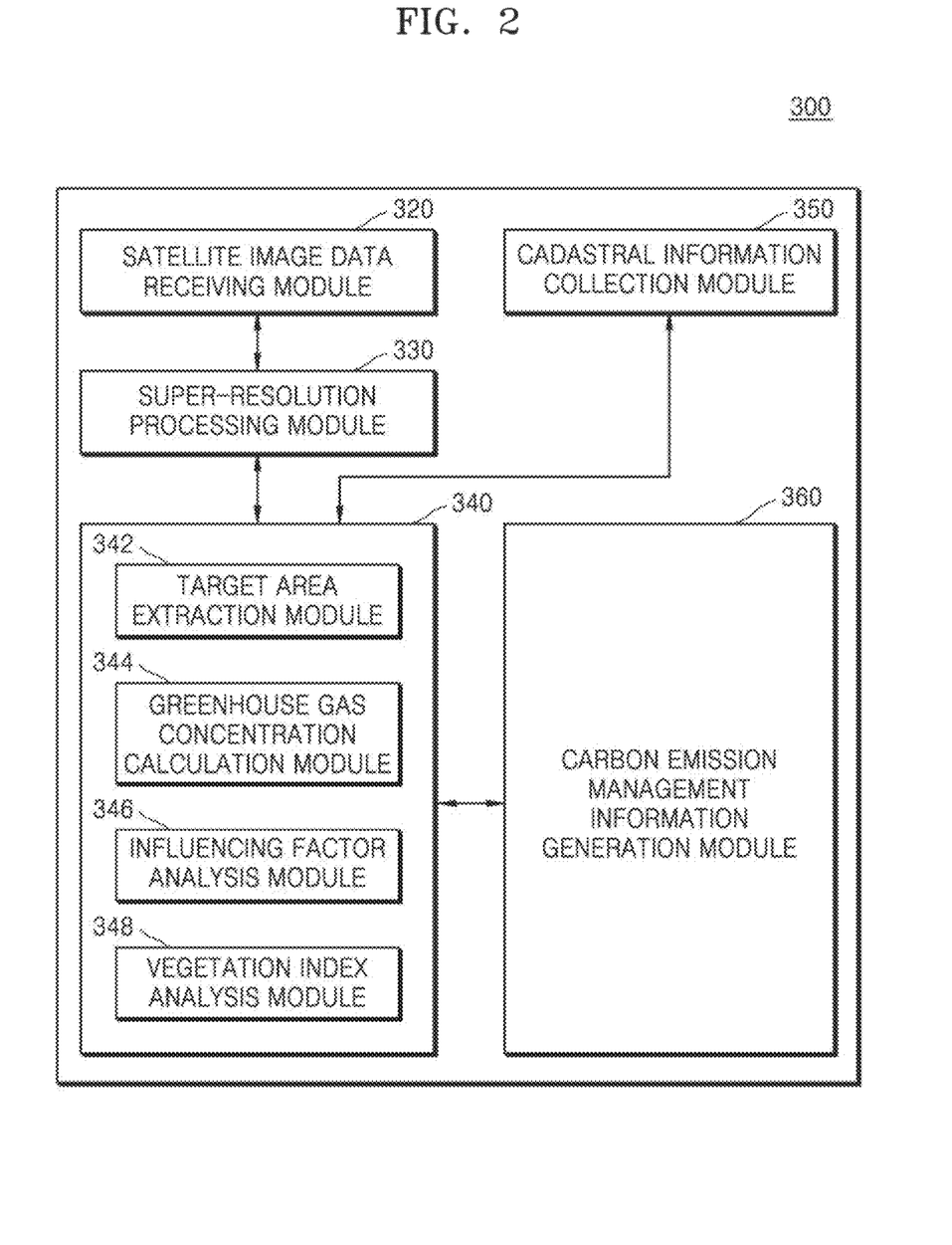
FIG. 2 is a block diagram of a carbon emission management information providing server shown in FIG. 1, according to an embodiment.

FIG. 2 is a block diagram of the carbon emission management information providing server 300 shown in FIG. 1, according to an embodiment. FIG. 3 is a view illustrating a process of performing an analysis by specifying an area corresponding to a company to be evaluated in the carbon emission management information providing server 300 shown in FIG. 2.

Referring to FIGS. 1 and 2, the carbon emission management information providing server 300 may include a satellite image data receiving module 320, a super-resolution processing module 330, a data extraction and analysis module 340, a cadastral information collection module 350, and a carbon emission management information generation module 360.

The module 320 may receive the satellite image data transmitted from the satellite 200, and transmit the received satellite image data to the super-resolution processing module 330.

According to an embodiment, the satellite image data receiving module 320 may process (e.g., resizing data, changing format) the received satellite image data into a form suitable for use in the carbon emission management information providing server 300.

The super-resolution processing module 330 may perform super-resolution processing of the satellite image data received from the satellite image data receiving module 320 and generate super-resolution processed satellite image data.

According to an embodiment, the super-resolution processing module 330 may improve a resolution of the satellite image data by using various processing techniques (e.g., high frequency component reconstruction, pre-processing filtering, super-resolution filtering, post-processing filtering, etc.).

According to an embodiment, in the carbon emission management information providing server 300, the configuration of the super-resolution processing module 330 may be omitted.

The data extraction and analysis module 340 may include a target area extraction module 342, a greenhouse gas concentration calculation module 344, an influencing factor analysis module 346, and a vegetation index analysis module 348.

The target area extraction module 342 may extract an area corresponding to a company to be evaluated from received satellite image data.

According to an embodiment, when a user inputs identification information or an address for a company to be evaluated through the user terminal 400, the target area extraction module 342 may request corresponding identification information or cadastral information about the address from the cadastral information collection module 350. The target area extraction module 342 may extract an area corresponding to the company to be evaluated from the satellite image data.

Figure 3:
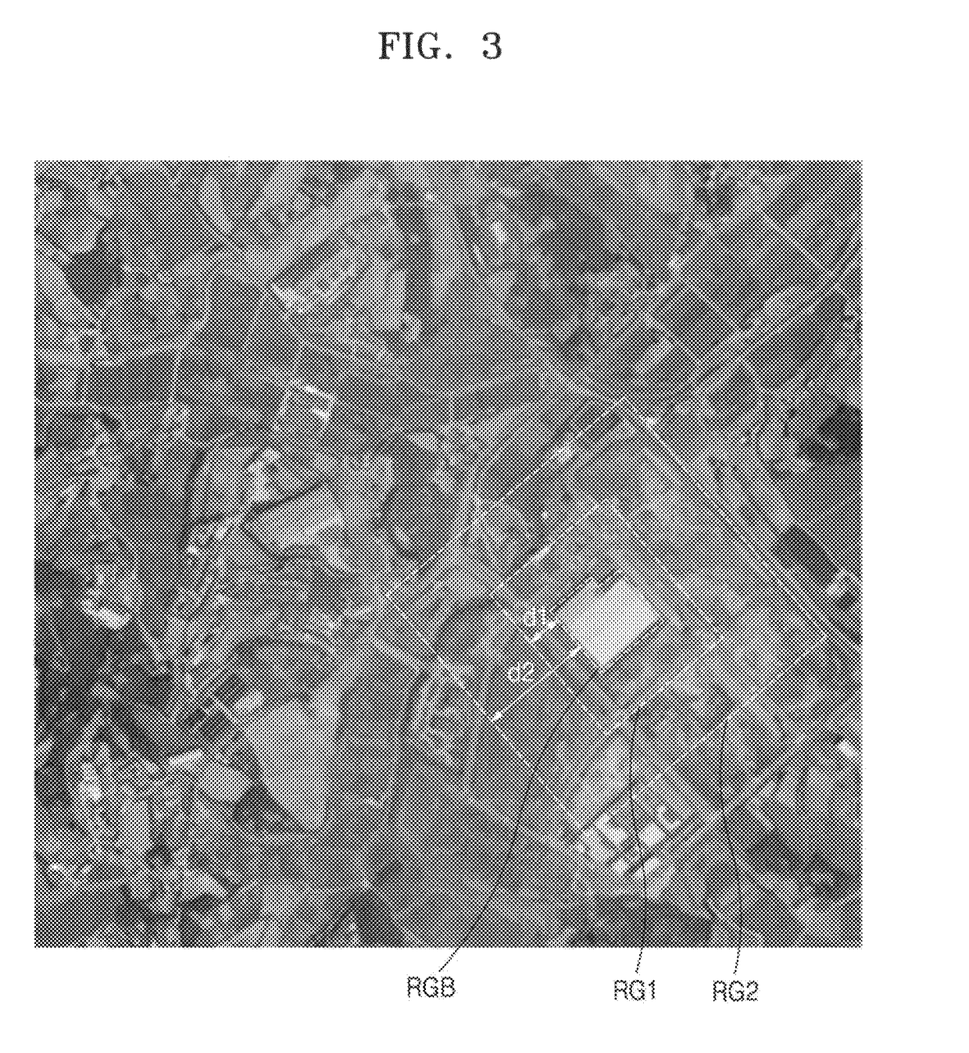
FIG. 3 is a view illustrating a process of performing an analysis by specifying an area corresponding to a company to be evaluated in the carbon emission management information providing server shown in FIG. 2.

Referring to FIG. 3 together, when a user inputs identification information or an address for a company to be evaluated through the user terminal 400, the target area extraction module 342 may first extract a building area RGB in which a building of the company to be evaluated exists.

Next, the target area extraction module 342 may extract the first area RG1 within a first reference distance d1 from the building area RGB.

According to an embodiment, the first area RG1 may be set as a boundary separated from all points of the building area RGB by the first reference distance d1.

According to another embodiment, the first area RG1 may be set in a shape such as a triangle, a rectangle, a polygon, a circle, an ellipse, or the like passing through a point separated by the first reference distance d1 from a plurality of reference points of the building area RGB.

According to an embodiment, the first area RG1 may mean an area for calculating a change in greenhouse gas concentration due to greenhouse gases emitted by the company to be evaluated.

According to an embodiment, the first reference distance d1, which is a criterion for extracting the first area RG1, may vary according to a width of the building area RGB. For example, as a width of the building area RGB is relatively great, the first reference distance d1 may be greater. For example, as a width of the building area RGB is relatively less, the first reference distance d1 may be less.

According to an embodiment, the target area extraction module 342 may extract a second area RG2 within a second reference distance d2 from the building area RGB.

According to an embodiment, the second area RG2 may be set as a boundary separated from all points of the building area RGB by the second reference distance d2.

According to another embodiment, the second area RG2 may be set in a shape such as a triangle, a rectangle, a polygon, a circle, an ellipse, or the like passing through a point separated by the second reference distance d2 from a plurality of reference points of the building area RGB.

According to an embodiment, the second area RG2 may mean a range of vegetation around the company to be evaluated that is expected to be affected by greenhouse gases emitted by the company to be evaluated.

According to an embodiment, the second area RG2 may be set greater than the first area RG1.

Returning to FIG. 2, the greenhouse gas concentration calculation module 344 may calculate a greenhouse gas concentration of an area (e.g., the first area RG1) corresponding to the company to be evaluated from the satellite image data based on an area (e.g., the first area RG1) extracted by the target area extraction module 342.

According to an embodiment, the greenhouse gas concentration calculation module 344 may extract a first image corresponding to a short-wavelength infrared (SWIR) wavelength band or a second image corresponding to a mid-wavelength infrared (SWIR) wavelength band from satellite image data including hyperspectral image data. The greenhouse gas concentration calculation module 344 may calculate a greenhouse gas concentration of an area (e.g., the first area RG1) corresponding to the company to be evaluated in the first image or the second image. For example, the greenhouse gas concentration calculation module 344 may calculate a greenhouse gas concentration through a color change in an image appearing in a wavelength band absorbed by molecules of a greenhouse gas (e.g., carbon dioxide, methane, nitrogen dioxide, hydrofluorocarbon, perfluorocarbon, sulfur hexafluoride, etc.) in the first image or the second image.

The influencing factor analysis module 346 may collect climate data around the company to be evaluated.

According to an embodiment, the climate data may include data about at least one of weather, temperature, and precipitation.

The influencing factor analysis module 346 may calculate a modified greenhouse gas concentration by removing influencing factors based on climate data from the greenhouse gas concentration in the area corresponding to the company to be evaluated calculated by the greenhouse gas concentration calculation module 344.

According to an embodiment, the influencing factor analysis module 346 may use climate data of the first area RG1 or the second area RG2.

The vegetation index analysis module 348 may calculate a change in vegetation index around the company to be evaluated from the satellite image data.

According to an embodiment, the vegetation index analysis module 348 may calculate a change in vegetation index in the second area RG2 of the satellite image data.

According to an embodiment, the second area RG2 analyzed by the vegetation index analysis module 348 may be greater than the area (e.g., the first area RG1) corresponding to the company to be evaluated analyzed by the greenhouse gas concentration calculation module 344.

According to an embodiment, a vegetation index analyzed by the vegetation index analysis module 348 may be a normalized difference vegetation index (NDVI).

The carbon emission management information generation module 360 may analyze a relationship between carbon emission management factors input in relation to the company to be evaluated and a change in greenhouse gas concentration calculated by the greenhouse gas concentration calculation module 344.

According to an embodiment, the carbon emission management factors may be input through the user terminal 400 and transmitted to the carbon emission management information providing server 300.

According to an embodiment, the carbon emission management factors may include at least one of an operation rate of devices in the company to be evaluated, fossil fuel consumption of the company to be evaluated, the status of carbon capture facilities of the company to be evaluated, and the amount of heating and cooling used by the company to be evaluated.

The carbon emission management information generation module 360 may calculate a relative influence of each of the carbon emission management factors on a change in greenhouse gas concentration of an area (e.g., the first area RG1) corresponding to the company to be evaluated as a numerical value.

For example, a ratio of the relative influence on the change in greenhouse gas concentration in the area (e.g., the first area RG1) corresponding to the company to be evaluated may be expressed in the form of an operation rate of devices in the company to be evaluated (20%), fossil fuel consumption of the company to be evaluated (35%), the status of carbon capture facilities of the company to be evaluated (25%), and the amount of heating and cooling used by the company to be evaluated (20%).

According to an embodiment, the carbon emission management information generation module 360 may analyze a relationship between carbon emission management factors input related to a company to be evaluated and a change in greenhouse gas concentration in an area corresponding to the company to be evaluated by using greenhouse gas concentration from which influencing factors based on climate data are removed by the influencing factor analysis module 346.

According to an embodiment, the carbon emission management information generation module 360 may analyze a relationship between carbon emission management factors input related to a company to be evaluated, a change in greenhouse gas concentration calculated by the greenhouse gas concentration calculation module 344, and a change in vegetation index calculated by the vegetation index analysis module 348, and may generate carbon emission management information according to a result of the analyzing. In this case, the carbon emission management information generation module 360 may generate carbon emission management information by using a relationship between the carbon emission management factors and the change in greenhouse gas concentration and a relationship between the carbon emission management factors and the change in vegetation index.

The carbon emission management information generation module 360 may provide the carbon emission management information according to the result of the analyzing to the user terminal 400.

According to an embodiment, the carbon emission management information may include information about factors that significantly affect changes in actual surrounding greenhouse gas concentration or changes in surrounding vegetation from among carbon emission management factors.

According to an embodiment, the carbon emission management information may include information about a carbon emission management factor to be managed with priority by a company to be evaluated from among carbon emission management factors.

According to an embodiment, the carbon emission management information generation module 360 may provide information about an abnormal situation when a calculated change in greenhouse gas concentration in an area corresponding to a company to be evaluated is greater than a reference value.

According to an embodiment, a method of providing carbon emission management information according to an embodiment may be implemented as program code and stored in a medium, and the medium may be combined with a processor to perform the method of providing carbon emission management information.

Figure 4:
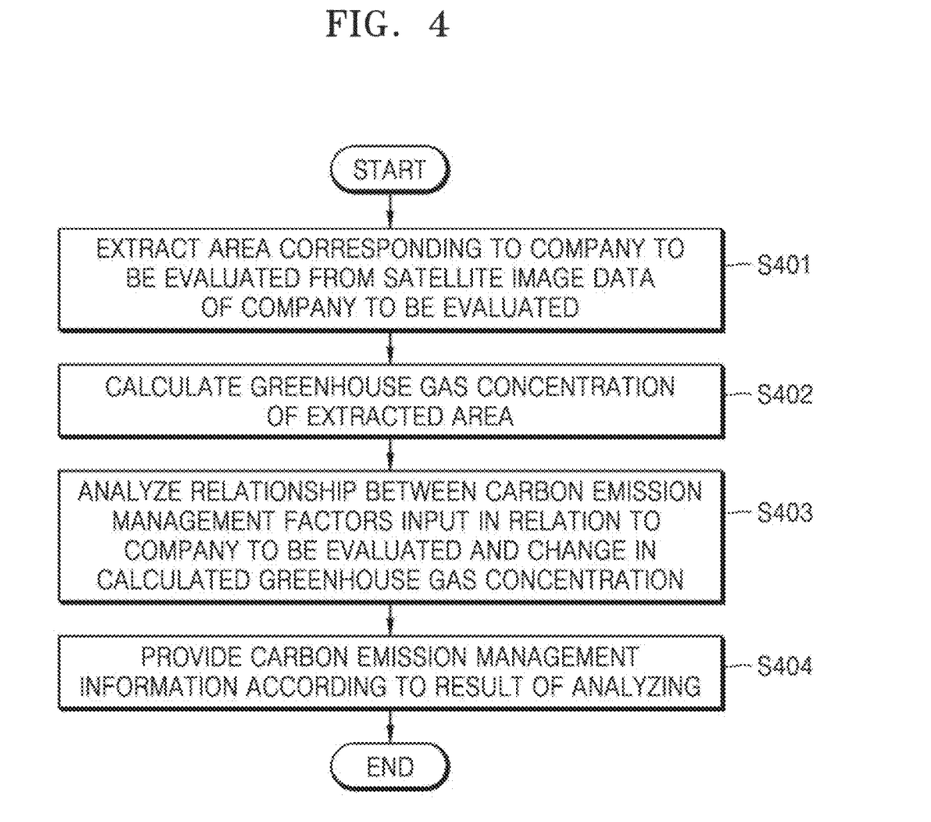
FIG. 4 is a flowchart of a method of providing carbon emission management information according to an embodiment.

FIG. 4 is a flowchart of a method of providing carbon emission management information according to an embodiment.

Referring to FIGS. 1 to 4, in operation S401, the carbon emission management information providing server 300 may extract an area corresponding to a company to be evaluated from satellite image data of the company to be evaluated.

According to an embodiment, the area corresponding to the company to be evaluated may be an area (e.g., the first area RG1) within a reference distance from a building area (e.g., RGB) of the company to be evaluated.

In operation S402, the carbon emission management information providing server 300 may calculate a greenhouse gas concentration of the area (e.g., the first area RG1) extracted in operation S401.

According to an embodiment, the carbon emission management information providing server 300 may extract a first image corresponding to a short-wavelength infrared wavelength band or a second image corresponding to a mid-wavelength infrared wavelength band from satellite image data including hyperspectral image data, and may calculate a greenhouse gas concentration of an area (e.g., the first area RG1) corresponding to the company to be evaluated in the first image or the second image.

In operation S403, the carbon emission management information providing server 300 may analyze a relationship between carbon emission management factors input in relation to the company to be evaluated and a change in the greenhouse gas concentration calculated in operation S402.

According to an embodiment, a greenhouse gas concentration value used in operation S403 may be a concentration value obtained by removing influencing factors based on climate data from the greenhouse gas concentration calculated in operation S402.

According to an embodiment, in operation S403, the carbon emission management information providing server 300 may analyze a relationship between carbon emission management factors input in relation to the company to be evaluated, the change in greenhouse gas concentration calculated in operation S402, and a change in vegetation index around the company to be evaluated.

In operation S404, the carbon emission management information providing server 300 may generate carbon emission management information according to a result of the analyzing in operation S403 and provide the generated carbon emission management information.

According to an embodiment, the carbon emission management information may include information about factors that significantly affect changes in actual surrounding greenhouse gas concentration or changes in surrounding vegetation from among carbon emission management factors.

Hereinabove, the present invention has been described with reference to the preferred embodiments. However, it will be appreciated by one of ordinary skill in the art that various modifications and changes of the present invention can be made without departing from the scope of the inventive concept which are defined in the appended claims and their equivalents.

A method and a device according to an embodiment may provide carbon emission management information through an analysis of a relationship between a change in greenhouse gas concentration around a company to be evaluated and carbon emission management factors of the company to be evaluated, thereby inducing efficient management of carbon emissions of the company to be evaluated.

What is claimed is:

1. A method of providing carbon emission management information, the method comprising:

extracting, by a carbon emission management information providing server, an area corresponding to a company to be evaluated from satellite image data of the company to be evaluated;

calculating, by the carbon emission management information providing server, a greenhouse gas concentration of the area corresponding to the company to be evaluated from the satellite image data;

calculating, by the carbon emission management information providing server, a change in vegetation index around the company to be evaluated from the satellite image data;

analyzing, by the carbon emission management information providing server, a relationship between carbon emission management factors input in relation to the company to be evaluated, a change in the calculated greenhouse gas concentration, and the calculated change in vegetation index;

generating, by the carbon emission management information providing server, carbon emission management information by using both a relationship between the carbon emission management factors and the change in the calculated greenhouse gas concentration and a relationship between the carbon emission management factors and the calculated change in vegetation index according to a result of the analyzing; and providing the generated carbon emission management information, wherein the carbon emission management factors comprise at least one of an operation rate of devices in the company to be evaluated, fossil fuel consumption of the company to be evaluated, a status of carbon capture facilities of the company to be evaluated, and amount of heating and cooling used by the company to be evaluated, and wherein the analyzing of the relationship between carbon emission management factors input in relation to the company to be evaluated, the change in the calculated greenhouse gas concentration, and the calculated change in vegetation index comprises:

calculating, by the carbon emission management information providing server, a relative influence of each of the carbon emission management factors on the change in the greenhouse gas concentration as a numerical value.

2. The method of claim 1, wherein the satellite image data comprises hyperspectral image data.

3. The method of claim 2, wherein the extracting of an area corresponding to the company to be evaluated comprises:

determining a building area of the company to be evaluated, and extracting an area within a reference distance from the building area as an area corresponding to the company to be evaluated.

4. The method of claim 3, wherein the calculating of a greenhouse gas concentration of the area corresponding to the company to be evaluated comprises:

extracting, by the carbon emission management information providing server, a first image corresponding to a short-wavelength infrared (SWIR) wavelength band or a second image corresponding to a mid-wavelength infrared (MWIR) wavelength band from the satellite image data, wherein the carbon emission management information providing server calculates a greenhouse gas concentration of the area corresponding to the company to be evaluated by using the first image or the second image.

5. The method of claim 1, wherein a vegetation index around the company to be evaluated is a vegetation index of vegetation distributed over a greater area than the area corresponding to the company to be evaluated.

6. The method of claim 5, wherein the vegetation index is a normalized difference vegetation index (NDVI).

7. The method of claim 6, further comprising:

collecting, by the carbon emission management information providing server, climate data around the company to be evaluated.

8. The method of claim 7, wherein the climate data comprises data about weather, temperature, and precipitation.

9. The method of claim 8, wherein the calculating of a greenhouse gas concentration of the area corresponding to the company to be evaluated comprises:

calculating, by the carbon emission management information providing server, a corrected greenhouse gas concentration by removing influencing factors based on the climate data from the calculated greenhouse gas concentration of the area corresponding to the company to be evaluated.

10. The method of claim 1, wherein the providing of the carbon emission management information according to a result of the analyzing comprises:

providing, by the carbon emission management information providing server, information about an abnormal situation when the change in the calculated greenhouse gas concentration in the area corresponding to the company to be evaluated is greater than a reference value.

11. A carbon emission management information providing server comprising at least one processor and a memory under control of the at least one processor, wherein the memory includes a computer program enabling the carbon emission management information providing server to perform operations comprising:

extracting an area corresponding to a company to be evaluated from satellite image data of the company to be evaluated;

calculating a greenhouse gas concentration of the area corresponding to the company to be evaluated from the satellite image data;

calculating a change in vegetation index around the company to be evaluated from the satellite image data; and analyzing a relationship between carbon emission management factors input in relation to the company to be evaluated, a change in the calculated greenhouse gas concentration, and the calculated change in vegetation index;

generating carbon emission management information by using both a relationship between the carbon emission management factors and the change in the calculated greenhouse gas concentration and a relationship between the carbon emission management factors and the calculated change in vegetation index according to a result of the analyzing; and providing the generated carbon emission management information, wherein the carbon emission management factors comprise at least one of an operation rate of devices in the company to be evaluated, fossil fuel consumption of the company to be evaluated, a status of carbon capture facilities of the company to be evaluated, and amount of heating and cooling used by the company to be evaluated, and wherein the generating of the carbon emission management information comprises:
calculating a relative influence of each of the carbon emission management factors on the change in the greenhouse gas concentration as a numerical value.

12. A carbon emission management information providing system comprising:
a user terminal; and
a carbon emission management information providing server configured to provide carbon emission management information to the user terminal in correspondence with carbon emission management factors related to a company to be evaluated input through the user terminal,
wherein the carbon emission management information providing server comprises at least one processor and a memory under control of the at least one processor, and the memory includes a computer program enabling the carbon emission management information providing server to perform operations comprising:
extracting an area corresponding to the company to be evaluated from satellite image data of the company to be evaluated;
calculating a greenhouse gas concentration of the area corresponding to the company to be evaluated from the satellite image data;
calculating a change in vegetation index around the company to be evaluated from the satellite image data;
analyzing a relationship between carbon emission management factors input in relation to the company to be evaluated, a change in the calculated greenhouse gas concentration, and the calculated change in vegetation index;
generating the carbon emission management information by using both a relationship between the carbon emission management factors and the change in the calculated greenhouse gas concentration and a relationship between the carbon emission management factors and the calculated change in vegetation index according to a result of the analyzing; and
providing the generated carbon emission management information,
wherein the carbon emission management factors comprise at least one of an operation rate of devices in the company to be evaluated, fossil fuel consumption of the company to be evaluated, a status of carbon capture facilities of the company to be evaluated, and amount of heating and cooling used by the company to be evaluated, and
wherein the generating of the carbon emission management information comprises:
calculating a relative influence of each of the carbon emission management factors on the change in the greenhouse gas concentration as a numerical value.

* * * * *